(12) United States Patent
DeGeorge

(10) Patent No.: US 9,702,284 B2
(45) Date of Patent: Jul. 11, 2017

(54) SYSTEM AND METHOD FOR DETECTING FACE-PLUGGING OF AN EXHAUST AFTERTREATMENT COMPONENT

(71) Applicant: Tenneco Automative Operating Company Inc., Lake Forest, IL (US)

(72) Inventor: John W. DeGeorge, Michigan Center, MI (US)

(73) Assignee: Tenneco Automotive Operating Company Inc., Lakes Forest, IL (US)

( * ) Notice: Subject to any disclaimer, the term of this patent is extended or adjusted under 35 U.S.C. 154(b) by 44 days.

(21) Appl. No.: 14/597,745

(22) Filed: Jan. 15, 2015

(65) Prior Publication Data

US 2016/0208666 A1 Jul. 21, 2016

(51) Int. Cl.
*F01N 3/023* (2006.01)
*F01N 9/00* (2006.01)
*F01N 3/20* (2006.01)

(52) U.S. Cl.
CPC ........... *F01N 3/0232* (2013.01); *F01N 3/023* (2013.01); *F01N 9/002* (2013.01); *F01N 3/2066* (2013.01); *F01N 2240/14* (2013.01); *F01N 2260/04* (2013.01); *F01N 2560/05* (2013.01); *F01N 2560/20* (2013.01); *F01N 2610/03* (2013.01); *F01N 2900/1402* (2013.01); *F01N 2900/1606* (2013.01); *Y02T 10/24* (2013.01); *Y02T 10/47* (2013.01)

(58) Field of Classification Search
CPC ........ F02D 41/029; F01N 9/002; F01N 3/035; F01N 3/0842; F01N 13/02
USPC ................. 60/273, 274, 295, 297, 301, 299; 73/117.75, 117.71
See application file for complete search history.

(56) References Cited

U.S. PATENT DOCUMENTS

| | | | |
|---|---|---|---|
| 6,367,320 B1 * | 4/2002 | Kueper | B01D 53/9495 73/114.69 |
| 7,628,007 B2 | 12/2009 | Kittelson et al. | |
| 7,662,197 B2 | 2/2010 | Duvinags et al. | |
| 7,685,814 B2 | 3/2010 | Zhang et al. | |
| 7,832,254 B2 | 11/2010 | Guenschel et al. | |

(Continued)

FOREIGN PATENT DOCUMENTS

GB   EP 2143903 A1 *   1/2010   ............. F01N 9/002
JP   2013083241 A   *   5/2013

(Continued)

OTHER PUBLICATIONS

Machine Translation, JP 2013-083241, Translated on Apr. 19, 2016.*

*Primary Examiner* — Patrick Maines
(74) *Attorney, Agent, or Firm* — Harness, Dickey & Pierce, P.L.C.

(57) ABSTRACT

An exhaust aftertreatment system may include an oxidation catalyst, a soot sensor, a filter and a control module. The oxidation catalyst may be disposed in an exhaust gas passageway and may receive exhaust gas discharged from an engine. The soot sensor may be at least partially disposed in the exhaust gas passageway downstream of the oxidation catalyst. The filter may be disposed in the exhaust gas passageway downstream of the soot sensor. The control module may be in communication with the soot sensor and may determine a face-plugging condition of the oxidation catalyst based on data received from the soot sensor.

17 Claims, 2 Drawing Sheets

(56) References Cited

U.S. PATENT DOCUMENTS

Figure 1:
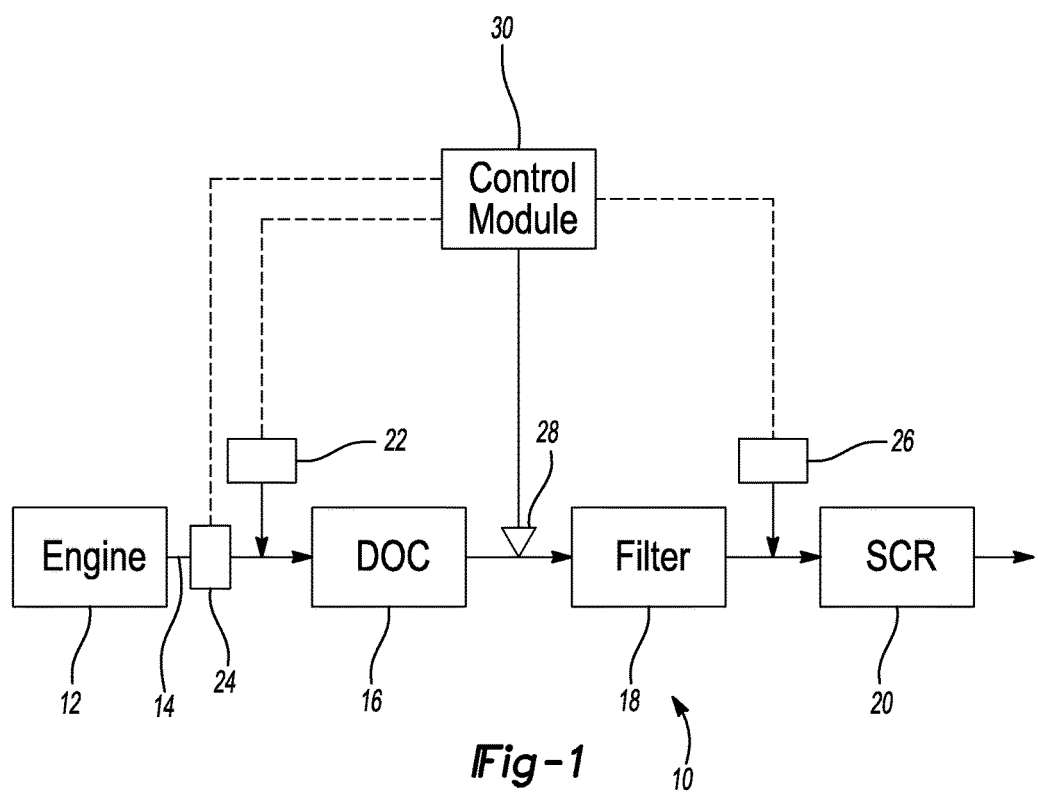

| | | |
|---|---|---|
| 7,900,500 B2 | 3/2011 | Krafthefer |
| 8,310,249 B2 | 11/2012 | Paterson |
| 8,447,461 B2 | 5/2013 | Nevin et al. |
| 8,713,991 B2 | 5/2014 | Allmendinger et al. |
| 8,769,937 B2 | 7/2014 | Yanakiev et al. |
| 2008/0010975 A1* | 1/2008 | Zhang .................. F01N 3/035 60/277 |
| 2008/0104946 A1* | 5/2008 | Wang .................. F01N 3/0231 60/295 |
| 2009/0241520 A1* | 10/2009 | Gendron ............... F01N 3/025 60/295 |
| 2011/0047973 A1* | 3/2011 | Wilhelm .............. F01N 3/0253 60/274 |
| 2012/0186329 A1 | 7/2012 | Yacoub et al. |
| 2012/0204537 A1* | 8/2012 | Dea ..................... F01N 9/002 60/273 |
| 2013/0318948 A1 | 12/2013 | Van Marion |
| 2014/0182270 A1 | 7/2014 | Jun |
| 2014/0202139 A1* | 7/2014 | Qi ...................... F01N 9/002 60/295 |
| 2014/0343747 A1* | 11/2014 | Culbertson ........... G05D 23/19 700/300 |

FOREIGN PATENT DOCUMENTS

| | | |
|---|---|---|
| KR | 20120056601 A | 6/2012 |
| KR | 20130133020 A | 12/2013 |
| WO | WO-2013191698 A1 | 12/2013 |

* cited by examiner

SYSTEM AND METHOD FOR DETECTING FACE-PLUGGING OF AN EXHAUST AFTERTREATMENT COMPONENT

FIELD

The present disclosure relates to a system and method for detecting face-plugging of an exhaust aftertreatment component.

BACKGROUND

This section provides background information related to the present disclosure and is not necessarily prior art.

In an attempt to reduce the quantity of $NO_x$ and particulate matter emitted to the atmosphere during internal combustion engine operation, a number of exhaust aftertreatment devices have been developed. A need for exhaust aftertreatment systems particularly arises when diesel combustion processes are implemented. Typical aftertreatment systems for diesel engine exhaust may include a hydrocarbon (HC) injector, a diesel oxidation catalyst (DOC), a diesel particulate filter (DPF), and a selective catalytic reduction (SCR) system (including a urea injector).

A problem that can arise through use of such aftertreatment systems is clogging or plugging of the DOC. DOC face-plugging can increase back pressure in the exhaust system, reduce catalytic performance and hinder regeneration of the DPF, for example. Therefore, it is desirable to provide an aftertreatment system that can effectively detect a DOC face-plugging condition and implement corrective action to rectify the face-plugging condition.

SUMMARY

This section provides a general summary of the disclosure, and is not a comprehensive disclosure of its full scope or all of its features.

In one form, the present disclosure provides an exhaust aftertreatment system that may include an oxidation catalyst, a soot sensor, a filter and a control module. The oxidation catalyst may be disposed in an exhaust gas passageway and may receive exhaust gas discharged from an engine. The soot sensor may be at least partially disposed in the exhaust gas passageway downstream of the oxidation catalyst. The filter may be disposed in the exhaust gas passageway downstream of the soot sensor. The control module may be in communication with the soot sensor and may determine a face-plugging condition of the oxidation catalyst based on data received from the soot sensor.

In some configurations, the filter is a diesel particulate filter.

In some configurations, the filter is a selective catalytic reduction filter.

In some configurations, the control module is in communication with an injector configured to inject a fuel into the exhaust gas passageway upstream of the oxidation catalyst in response to the control module detecting the face-plugging condition.

In some configurations, the control module calculates a modeled soot mass flow value and compares the modeled soot mass flow value with a measured soot mass flow value received from the soot sensor.

In some configurations, the control module calculates a sum of a modeled soot mass flow value with a previous modeled soot mass flow value. The control module may trigger at least one of a regeneration event and a fault warning in response to the sum being at or above a predetermined threshold.

In some configurations, the control module determines the face-plugging condition based on a comparison of a threshold value with a difference between a modeled soot mass flow value and a measured soot mass flow value received from the soot sensor.

In some configurations, the control module triggers a regeneration event in response to detection of the face-plugging condition of the oxidation catalyst.

In some configurations, the control module triggers a fault warning in response to detection of the face-plugging condition of the oxidation catalyst.

In some configurations, the exhaust aftertreatment system includes a fluid injector in communication with the control module. The control module may cause the fluid injector to inject a fluid into the exhaust gas passageway in response to detection of the face-plugging condition of the oxidation catalyst.

In some configurations, the fluid includes a hydrocarbon fuel.

In another form, the present disclosure provides a method that may include positioning a soot sensor at least partially in an exhaust gas passageway downstream of an oxidation catalyst, the exhaust gas passageway receiving exhaust gas discharged from an engine; using the soot sensor to take measurements indicative of an amount of soot in exhaust gas exiting the oxidation catalyst; and determining a face-plugging condition of the oxidation catalyst based on data received from the soot sensor.

In some configurations, the soot sensor is positioned upstream of a filter. The filter can be a diesel particulate filter or a selective catalytic reduction filter, for example.

In some configurations, the method includes using an injector to inject a fuel into the exhaust gas passageway upstream of the oxidation catalyst in response to detecting the face-plugging condition.

In some configurations, the method includes calculating a modeled soot mass flow value and comparing the modeled soot mass flow value with a measured soot mass flow value received from the soot sensor.

In some configurations, the method includes calculating a sum of the modeled soot mass flow value with a previous modeled soot mass flow value. The control module may trigger at least one of a regeneration event and a fault warning in response to the sum being at or above a first threshold value.

In some configurations, the face-plugging condition is determined based on a comparison of a second threshold value with a difference between the modeled soot mass flow value and the measured soot mass flow value received from the soot sensor.

In some configurations, the method includes triggering a regeneration event in response to detection of the face-plugging condition of the oxidation catalyst.

In some configurations, the method includes triggering a fault warning in response to detection of the face-plugging condition of the oxidation catalyst.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 2:
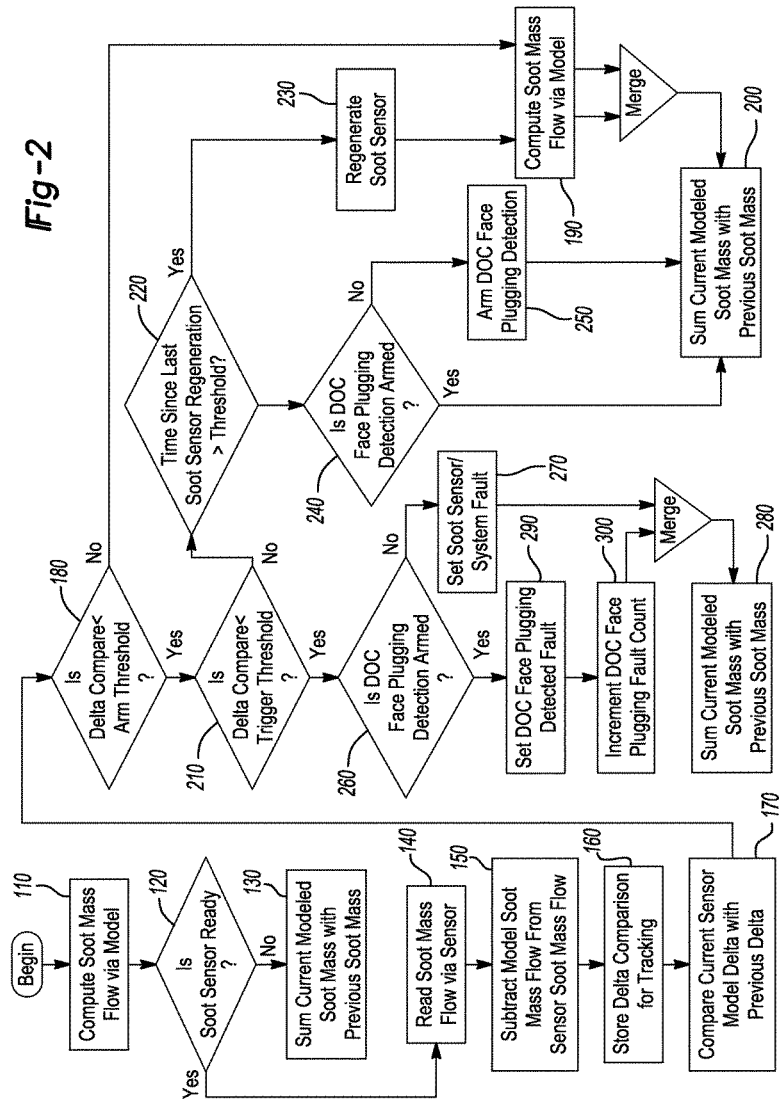

FIG. 1 is a schematic representation of an engine and an exhaust aftertreatment system according to the principles of the present disclosure; and FIG. 2 is a flowchart illustrating a method according to the principles of the present disclosure.

Corresponding reference numerals indicate corresponding parts throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

With reference to FIG. 1, an exhaust aftertreatment system 10 is provided that may treat exhaust gas output by a combustion engine 12. The exhaust aftertreatment system 10 may include an exhaust gas passageway 14, an oxidation catalyst (e.g., a diesel oxidation catalyst or DOC) 16, a filter 18 and a selective catalytic reduction (SCR) catalyst 20. The DOC 16, filter 18 and SCR catalyst 20 are disposed within the exhaust gas passageway 14 such some or all of the that exhaust gas output from engine 12 flows therethrough. The filter 18 may be a diesel particulate filter (DPF) or a selective catalytic reduction filter (SCRF), for example.

A hydrocarbon (HC) injector 22 may be disposed at least partially within the exhaust gas passageway 14 upstream of the DOC 16. The HC injector 22 may receive hydrocarbon fuel from a fuel tank (not shown) and may inject into the fuel into the stream of exhaust gas upstream of the DOC 16. A burner 24 may be disposed at least partially within the exhaust gas passageway 14 upstream of the DOC 16 at or adjacent the HC injector 22. The burner 24 may ignite the fuel injected by the HC injector 22 to regenerate the DOC 16 and/or the filter 18.

A reductant injector 26 may be disposed at least partially within the exhaust gas passageway 14 downstream of the filter 18 and upstream of the SCR catalyst 20. The reductant injector 26 may receive a reductant (e.g., urea) from a reductant tank (not shown) and inject the reductant into the exhaust stream upstream of the SCR catalyst 20.

A soot sensor 28 may be disposed at least partially within the exhaust gas passageway 14 at a location downstream of the DOC 16 and upstream of the filter 18, for example. The soot sensor 28 can be any type of sensor capable of measuring a soot mass or soot mass flow rate in the exhaust stream or any type of sensor capable of measuring a parameter of the exhaust stream that is indicative of a soot mass value or soot mass flow rate. For example, in some configurations, the soot sensor 28 could include a circuit having a pair of electrically conductive plates or probes (not shown) configured such that accumulation or presence of soot on the plates or probes changes the resistance in the circuit, thereby indicating a soot mass in the exhaust gas.

A control module 30 may be in communication with the HC injector 22, the burner 24, the reductant injector 26 and the soot sensor 28. The control module 30 may control operation of the HC injector 22, the burner 24 and the reductant injector 26. As will be described in more detail below, the control module 30 may detect the presence or absence of a face-plugging condition on the DOC 16. If the control module 30 determines that the DOC 16 is plugged, the control module 30 can trigger a regeneration event (using the HC injector 22 and burner 24, for example) to unplug the DOC 16. If the face-plugging condition is not rectified by the regeneration event, the control module 30 can trigger a fault warning (e.g., an audible alarm or warning or a visual check-engine warning, etc.) urging a driver of the vehicle to have the DOC serviced.

Referring now to FIG. 2, a method of detecting DOC face-plugging will be described. At step 110, the control module 30 may calculate a modeled soot mass flow value using known equations based on engine operating parameters and/or one or more lookup tables, for example. At step 120, the control module 30 may determine if the soot sensor 28 is in a ready state (i.e., whether the soot sensor 28 is in a condition to make measurements from the exhaust gas stream and communicate with the control module 30). If the soot sensor 28 is not in a ready state, the control module 30 may, at step 130, sum the modeled soot mass flow value determined at step 110 with a previously calculated soot mass flow value.

If, at step 120, the control module 30 determines that the soot sensor 28 is in a ready state, the control module 30 may, at step 140, receive and read a measured soot mass flow value from the soot sensor 28 or convert data received from the soot sensor 28 into a measured soot mass flow value. At step 150, the control module 30 may calculate a difference between the modeled soot mass flow value and the measured soot mass flow value. At step 160, the control module 30 may store the difference calculated at step 150 in a memory circuit associated with the control module 30. At step 170, the control module 30 may determine a delta comparison value by comparing the difference calculated at step 150 with a previously stored difference (i.e., a previously calculated difference between a previous modeled soot mass flow value and a previous measured soot mass flow value).

At step 180, the control module 30 may determine if the delta comparison value determined at step 170 is less than a predetermined arm threshold. If the delta comparison value is greater than or equal to the predetermined arm threshold, the control module 30 may, at step 190, calculate a modeled soot mass flow value (in the manner described above with respect to step 110). At step 200, the control module 30 may sum the modeled soot mass flow value determined at step 190 or at step 110 with a previously calculated soot mass flow value.

If, at step 180, the control module 30 determines that the delta comparison value is less than the predetermined arm threshold, the control module 30 may, at step 210, determine if the delta comparison value is less than a predetermined trigger threshold (which may be a different threshold than the arm threshold). If the delta comparison value is greater than or equal to the predetermined trigger threshold, the control module 30 may, at step 220, determine if an elapsed time since a last soot sensor regeneration event is greater than a predetermined time threshold. If the elapsed time since the last soot sensor regeneration event is greater than the predetermined time threshold, the control module 30 may trigger a soot sensor regeneration event at step 230. The soot sensor regeneration event may include heating the soot sensor 28 using an electrical heating device. For example, the soot sensor 28 could include a glow plug (not shown) or other heating device that is controlled by the control module 30 and can burn soot and/or other contaminants off of the soot sensor 28.

Following the soot sensor regeneration event at step 230, the control module 30 may, at step 190, calculate a modeled soot mass flow value, as described above. Thereafter, at step 200, the control module 30 may sum the modeled soot mass flow value determined at step 190 or at step 110 with a previously calculated soot mass flow value, as described above.

If the control module 30 determines at step 220 that the elapsed time since the last soot sensor regeneration event is not greater than the predetermined time threshold, the control module 30 may, at step 240, determine if a DOC face-plugging detection mode is armed (turned on). If the DOC face-plugging detection mode is not armed, then the control module 30 may arm the DOC face-plugging detection mode at step 250. Thereafter, the algorithm may proceed to step 200 to sum the modeled soot mass flow value determined at step 190 or at step 110 with a previously calculated soot mass flow value, as described above. If the control module 30 determines at step 240 that the DOC face-plugging detection mode is armed, then the algorithm may proceed directly to step 200.

If the control module 30 determines at step 210 that the delta comparison value is less than the predetermined trigger threshold, the control module 30 may, at step 260, determine if a DOC face-plugging detection mode is armed (turned on). If the DOC face-plugging detection mode is not armed, then the control module 30 may, at step 270, record a soot sensor fault or a face-plugging detection system fault. If a predetermined number of soot sensor faults or a face-plugging detection system faults are recorded, the control module 30 may trigger a warning (e.g., an audible and/or visual warning such as a check-engine light or message) indicating to the vehicle driver and/or owner that the soot sensor 28 and/or the face-plugging detection system may need to be serviced (e.g., by a vehicle maintenance or service technician). Following step 270, the control module 30 may, at step 280, sum the modeled soot mass flow value determined at step 110 with a previously calculated soot mass flow value.

If the control module 30 determines at step 260 that the DOC face-plugging detection mode is armed, then the control module 30 may, at step 290, set a DOC face-plugging fault (indicating the presence of a face-plugging condition on the DOC 16) and increment a count of DOC face-plugging faults at step 300. Thereafter, the control module 30 may, at step 280, sum the modeled soot mass flow value determined at step 110 with a previously calculated soot mass flow value.

The algorithm described above and shown in FIG. 2 may be repeated continuously or intermittently during operation of the engine 12. When the DOC face-plugging detection mode is armed and the sum value determined at any of steps 130, 200, 280 is at or above a predetermined threshold (e.g., about three grams per liter in an exemplary embodiment), the control module 30 can trigger a DOC regeneration event and/or a fault warning. Additionally or alternatively, if the number of DOC face-plugging faults (i.e., if the number of incremented faults at step 300) is at or above a predetermined fault threshold, the control module 30 may trigger a DOC regeneration event and/or a fault warning. The DOC regeneration event can include using the burner 24 to ignite fuel injected into the exhaust gas passageway 14 by the injector 22 upstream of the DOC 16. Hot gases produced by igniting the fuel can burn soot off of the DOC 16, thereby unplugging the DOC 16. The fault warning can be triggered to alert a user or owner of a vehicle (not shown) in which the engine 12 and aftertreatment system 10 are installed that the DOC 16 may need to be serviced (e.g., by a vehicle maintenance or service technician) to unplug or replace the DOC 16. The fault warning can be an audible tone or alarm and/or a visual warning indicator (e.g., a check-engine light and/or a warning message displayed on a vehicle information screen), for example.

In some configurations, the aftertreatment system 10 could include one or more additional soot sensors disposed downstream of the SCR catalyst 20 or between the filter 18 and the SCR catalyst 20. In some configurations, in addition to determining an amount of soot buildup on the DOC 16, the control module 30 may determine an amount of soot buildup on one or both of the filter 18 and the SCR catalyst 20. Based on such information, the control module may trigger a regeneration of one or more of the DOC 16, the filter 18 and the SCR catalyst 20.

In an exemplary embodiment, if the DOC soot is greater than three grams per liter, the filter soot is less than 2.5 grams per liter, and/or the SCR soot is less than 1.5 grams per liter, then the control module 30 may trigger a DOC regeneration event. If the DOC soot is greater than three grams per liter, the filter soot is less than 2.5 grams per liter, and/or the SCR soot is greater than 1.5 grams per liter, then the control module 30 may trigger an SCR regeneration event. If the DOC soot is greater than three grams per liter and the filter soot is greater than 2.5 grams per liter, then the control module 30 may trigger an filter regeneration event. If the DOC soot is less than three grams per liter and the filter soot is greater than five grams per liter, then the control module 30 may trigger an filter regeneration event. If the DOC soot is less than three grams per liter and the SCR soot is greater than 3 grams per liter, then the control module 30 may trigger an SCR regeneration event.

In this application, including the definitions below, the term "module" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above and/or other descriptions above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. §112(f) unless an element is expressly recited using the phrase "means for," or in the case of a method claim using the phrases "operation for" or "step for."

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An exhaust aftertreatment system comprising:
an oxidation catalyst disposed in an exhaust gas passageway and receiving exhaust gas discharged from an engine;
a soot sensor at least partially disposed in the exhaust gas passageway downstream of the oxidation catalyst;
a filter disposed in the exhaust gas passageway downstream of the soot sensor; and
a control module in communication with the soot sensor and determining a face-plugging condition of the oxidation catalyst based on data received from the soot sensor,
wherein the control module determines the face-plugging condition based on a comparison of a threshold value with a difference between a modeled soot mass flow value and a measured soot mass flow value received from the soot sensor.

2. The exhaust aftertreatment system of claim 1, wherein the filter is a diesel particulate filter.

3. The exhaust aftertreatment system of claim 1, wherein the filter is a selective catalytic reduction filter.

4. The exhaust aftertreatment system of claim 1, wherein the control module is in communication with an injector configured to inject a fuel into the exhaust gas passageway upstream of the oxidation catalyst in response to the control module detecting the face-plugging condition.

5. The exhaust aftertreatment system of claim 1, wherein the control module calculates a modeled soot mass flow value and compares the modeled soot mass flow value with a measured soot mass flow value received from the soot sensor.

6. The exhaust aftertreatment system of claim 1, wherein the control module calculates a sum of a modeled soot mass flow value with a previous modeled soot mass flow value, and wherein the control module triggers at least one of a regeneration event and a fault warning in response to the sum being at or above a predetermined threshold.

7. The exhaust aftertreatment system of claim 1, wherein the control module triggers a regeneration event in response to detection of the face-plugging condition of the oxidation catalyst.

8. The exhaust aftertreatment system of claim 1, wherein the control module triggers a fault warning in response to detection of the face-plugging condition of the oxidation catalyst.

9. The exhaust aftertreatment system of claim 1, further comprising a fluid injector in communication with the control module, the control module causing the fluid injector to inject a fluid into the exhaust gas passageway in response to detection of the face-plugging condition of the oxidation catalyst.

10. The exhaust aftertreatment system of claim 9, wherein the fluid includes a hydrocarbon fuel.

11. A method comprising:
positioning a soot sensor at least partially in an exhaust gas passageway downstream of an oxidation catalyst, the exhaust gas passageway receiving exhaust gas discharged from an engine;
using the soot sensor to take measurements indicative of an amount of soot in exhaust gas exiting the oxidation catalyst;
determining a face-plugging condition of the oxidation catalyst based on data received from the soot sensor;
calculating a modeled soot mass flow value and comparing the modeled soot mass flow value with a measured soot mass flow value received from the soot sensor; and
calculating a sum of the modeled soot mass flow value with a previous modeled soot mass flow value, and wherein the control module triggers at least one of a regeneration event and a fault warning in response to the sum being at or above a first threshold value,
wherein the face-plugging condition is determined based on a comparison of a second threshold value with a difference between the modeled soot mass flow value and the measured soot mass flow value received from the soot sensor.

12. The method of claim 11, wherein the soot sensor is positioned upstream of a filter.

13. The method of claim 12, wherein the filter is a diesel particulate filter.

14. The method of claim 12, wherein the filter is a selective catalytic reduction filter.

15. The method of claim 11, further comprising using an injector to inject a fuel into the exhaust gas passageway upstream of the oxidation catalyst in response to detecting the face-plugging condition.

16. The method of claim 11, further comprising triggering a regeneration event in response to detection of the face-plugging condition of the oxidation catalyst.

17. The method of claim 11, further comprising triggering a fault warning in response to detection of the face-plugging condition of the oxidation catalyst.

* * * * *

UNITED STATES PATENT AND TRADEMARK OFFICE
CERTIFICATE OF CORRECTION

PATENT NO. : 9,702,284 B2  
APPLICATION NO. : 14/597745  
DATED : July 11, 2017  
INVENTOR(S) : John W. DeGeorge Page 1 of 1

It is certified that error appears in the above-identified patent and that said Letters Patent is hereby corrected as shown below:

On the Title Page

(71) Applicant: Replace "Automative" with --Automotive--

(73) Assignee: Replace "Lakes Forest" with --Lake Forest--

In the Specification

Column 6, Line 63: Before "injector", insert --HC--

Signed and Sealed this  
Fifth Day of December, 2017

Joseph Matal  
*Performing the Functions and Duties of the*  
*Under Secretary of Commerce for Intellectual Property and*  
*Director of the United States Patent and Trademark Office*